(12) United States Patent
Suzuki et al.

(10) Patent No.: US 7,812,587 B2
(45) Date of Patent: Oct. 12, 2010

(54) LED DRIVE CIRCUIT

(75) Inventors: Takayuki Suzuki, Hamamatsu (JP);
Shintaro Meguri, Hamamatsu (JP);
Takashi Asahara, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 512 days.

(21) Appl. No.: 11/632,907

(22) PCT Filed: Jul. 22, 2005

(86) PCT No.: PCT/JP2005/013456

§ 371 (c)(1),
(2), (4) Date: Mar. 18, 2008

(87) PCT Pub. No.: WO2006/009242

PCT Pub. Date: Jan. 26, 2006

(65) Prior Publication Data

US 2009/0039860 A1 Feb. 12, 2009

(30) Foreign Application Priority Data

Jul. 22, 2004 (JP) ............................. 2004-214944

(51) Int. Cl.
*G05F 3/16* (2006.01)
(52) U.S. Cl. .................. 323/315; 327/108; 327/535
(58) Field of Classification Search .................. 323/315, 323/316, 280, 281, 237, 274, 907, 282; 327/108, 327/419, 346, 530, 535, 545, 312; 363/65, 363/71, 58; 315/291, 292, 316, 324; 372/38.07, 372/33
See application file for complete search history.

(56) References Cited

U.S. PATENT DOCUMENTS 4,494,801 A * 1/1985 Ohmori et al. .............. 303/186
4,573,005 A * 2/1986 van de Plassche ........... 323/315
5,124,597 A * 6/1992 Stuebing et al. ............. 327/261
5,654,629 A * 8/1997 Theus ......................... 323/316
5,736,844 A * 4/1998 Yanagisawa ................. 323/282
6,037,832 A * 3/2000 Kaminishi ................... 327/538
6,222,862 B1 * 4/2001 Kinbara et al. ........... 372/38.04
6,510,168 B1 * 1/2003 Kikuchi .................... 372/38.02

FOREIGN PATENT DOCUMENTS

| JP | 2-9182 | 1/1990 |
|---|---|---|
| JP | 3-270279 | 12/1991 |
| JP | 5-327084 | 12/1993 |
| JP | 6-326384 | 11/1994 |
| JP | 6-103773 | 12/1994 |
| JP | 11-74567 | 3/1999 |
| JP | 2000-228543 | 8/2000 |

* cited by examiner

*Primary Examiner*—Rajnikant B Patel
(74) *Attorney, Agent, or Firm*—Drinker Biddle & Reath LLP

(57) ABSTRACT

An LED driving circuit can improve characteristics. A first current increasing circuit $10i_4$ is constituted of a first slow regulating unit $10i_{41}$ and a post-stage first supplying circuit $10i_{43}$ and, from a point in time of output switching of a first comparator $10i_2$, that is, when a set temperature exceeding a reference potential Va is attained, gradually increases a temperature compensated current $I_{T1}$ ($\Delta I1$) and thereby suppresses the lowering of emission output. Here, by gradually increasing the temperature compensated current $I_{T1}$ by making use of charging/discharging functions of a capacitor, etc., that is, by increasing the temperature compensated current $I_{T1}$ over a longer time than a pulse width that a photodetecting element, onto which light from an LED 11 is made incident, can respond within, pulse width distortion and jitter can be suppressed.

6 Claims, 16 Drawing Sheets

LED DRIVE CIRCUIT

TECHNICAL FIELD

This invention relates to an LED (light emitting diode) driving circuit.

BACKGROUND ART

High-speed devices with a wide dynamic range are required in communications using POFs (plastic optical fibers).

LED driving circuits for use in such applications are desired. A conventional LED driving circuit is, for example, described in Patent Document 1 indicated below. With the arrangement of Patent Document 1, response characteristics are improved using a peaking current generating circuit.

Patent Document 1: Japanese Published Unexamined Patent Application No. Hei-11-74567.

DISCLOSURE OF THE INVENTION

However, because LED driving circuits are used for vehicle-mounted optical communications (for optical audio applications), etc., and are strongly affected by heat and other temperature effects due to the vehicle exterior environment and the vehicle driving mechanism itself, characteristics of LED driving circuits are insufficient.

This invention has been made in view of the above issue, and an object thereof is to provide an LED driving circuit that can be improved in characteristics.

To achieve the above object, a first aspect of the invention provides an LED driving circuit including: a first current source connected to an LED; a transistor controlling a driving current flowing between the first current source and the LED; a timing generating circuit generating a driving signal to be applied to a control terminal of the transistor; and a temperature compensated current generating circuit applying a temperature compensated current to the first current source; and with this LED driving circuit, the temperature compensated current generating circuit includes a temperature detecting circuit; a first comparator inputting an output of the temperature detecting circuit; and a first current increasing circuit gradually increasing the temperature compensated current from a point in time at which output switching occurs at the first comparator.

With this LED driving circuit, the driving current between the first current source and the LED is controlled by the timing generating circuit applying the driving signal to the control terminal of the transistor. The LED is made to emit light by the driving current. The temperature compensated current is applied to the first current source, and emission output, based on the driving current, is thereby compensated for temperature fluctuation. That is, the lowering of the driving current and the emission output in accordance with temperature rise is compensated by superposition of the temperature compensated current.

The temperature compensated current generating circuit provides the temperature compensated current. The output of the temperature detecting circuit is input into the first comparator, and at a set temperature, the output of the first comparator switches. From the point in time of the output switching of the first comparator, that is, when the set temperature is reached, the first current increasing circuit gradually increases the temperature compensated current and suppresses the lowering of the emission output. Here, by gradually increasing the temperature compensated current using a charging/discharging function of a capacitor, etc., that is, by increasing the temperature compensated current over a time that is longer than a pulse width that a photodetecting element, onto which light from the LED is made incident, can respond within, pulse width distortion and jitter are suppressed and the driving current and the emission output are also prevented from becoming excessive due to lowering of the temperature.

In an LED driving circuit according to a second aspect of the invention, the first current increasing circuit includes a first capacitor varying a voltage from the point in time of output switching of the first comparator, and a first current controlling transistor having a control terminal, into which the voltage of the first capacitor is input, and applying at least a portion of the temperature compensated current.

That is, preferably by directly or indirectly applying the output of the first comparator to the first capacitor, a gradually increasing voltage, input into the control terminal of the transistor, is generated and this can be used to provide the temperature compensated current.

In an LED driving circuit according to a third aspect of the invention, the temperature compensated current generating circuit includes: a second comparator inputting the output of the temperature detecting circuit; and a second current increasing circuit gradually increasing the temperature compensated current from a point in time at which output switching occurs at the second comparator; and the output currents of the first and second current increasing circuits are superposed and constitute a portion of the temperature compensated current.

In this case, by setting reference potentials of the first and second comparators corresponding to different set temperatures, the control target value of the temperature compensated current can be set in two steps. A larger number of steps can be set for the control target value of the temperature compensated current by increasing the number of comparators.

In an LED driving circuit according to a fourth aspect of the invention, the second current increasing circuit includes: a second capacitor varying a voltage from the point in time of output switching of the second comparator; and a second current controlling transistor having a control terminal, into which the voltage of the second capacitor is input, and applying at least a portion of the temperature compensated current.

That is, preferably by directly or indirectly applying the output of the second comparator to the second capacitor, a gradually increasing voltage, input into the control terminal of the transistor, is generated along with that generated by the first current increasing circuit and this can be used to provide the temperature compensated current.

An LED driving circuit according to a fifth aspect of the invention includes a second current source connected to the LED, and the timing generating circuit drives the second current source in a manner such that a peaking current is supplied to the LED from the second current source.

In this case, because the peaking current from the second current source, controlled by the timing generating circuit, is superposed on the driving current applied to the LED from the first current source, the LED emission output, according to the driving current, can be compensated for rounding.

An LED driving circuit according to a sixth aspect of the invention includes an LVDS receiving comparator having an output terminal connected to an input terminal of the timing generating circuit, and two input terminals, into which differential signals are input.

With LVDS (Low Voltage Differential Signaling), because differential signal data transmission in a single channel is enabled at a rate of several hundred to several thousand Mbps and because a low amplitude signal is output by a current mode driving circuit, ringing and switching spikes hardly occur and signal transmission of low noise can be performed with low consumption power across a wide frequency bandwidth. Because differential signals are input into the LVDS receiving comparator and the LED driving timing is generated by the timing generating circuit according to the signal output from the output terminal of the LVDS receiving comparator, ringing and switching spikes of the LED emission output in the final stage can be further suppressed.

With the LED driving circuit according to this invention, characteristics can be improved.

Figure 1:
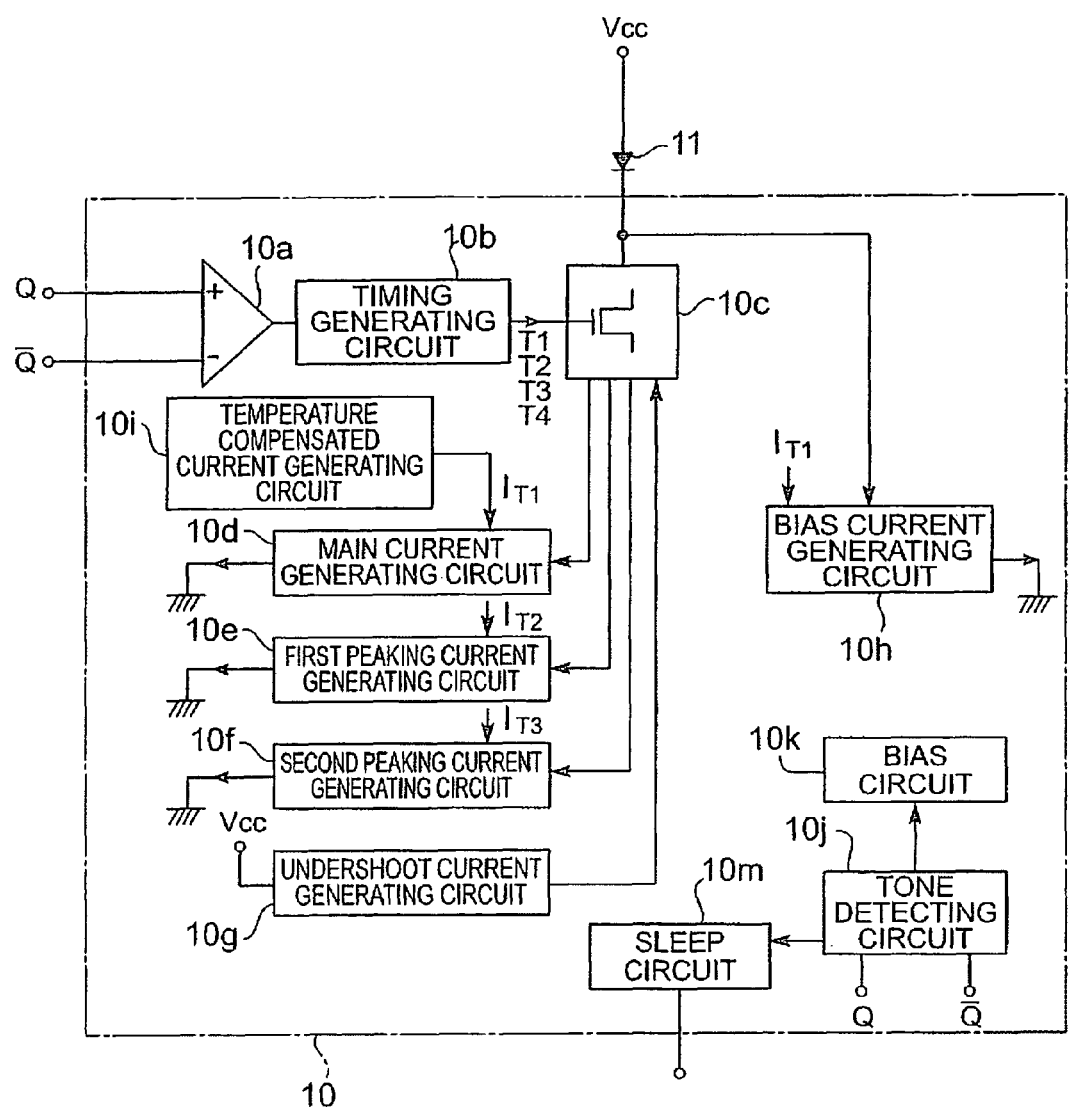
FIG. 1 is a circuit diagram of an LED driving circuit according to an embodiment.

DESCRIPTION OF SYMBOLS 10g undershoot current generating circuit
$10i_5$ amplifier
10m sleep circuit
10b timing generating circuit
10j tone detecting circuit
10k bias circuit
10h bias current generating circuit
10e first peaking current generating circuit
10f second peaking current generating circuit
10d main current generating circuit
10a receiving comparator
10b3 post amplifier
10b4 post amplifier
10b5 post amplifier
10b6 post amplifier
10 LED driving circuit
$10i_2$ comparator
$10i_1$ temperature detecting circuit
10i temperature compensated current generating circuit
$10i_4$ slow regulating unit
$10i_{42}$ slow regulating unit
10b7 regulating circuit
10b9 regulating circuit
10b11 regulating circuit
$10i_4$ current increasing circuit
$10i_6$ current increasing circuit A amplifier
C1 capacitor
C2 capacitor
D1, D2 diodes
$I_{T1}$ temperature compensated current
$I_{T2}$ temperature compensated current

BEST MODES FOR CARRYING OUT THE INVENTION

FIG. 1 is a circuit diagram of an LED driving circuit according to an embodiment.

This LED driving circuit 10 has an LVDS receiving comparator 10a, into which differential signals (Q and Q-bar) are input from an LVDS (Low Voltage Differential Signaling) driver. An appropriate LVDS receiver (not shown) may be disposed at a pre-stage of the comparator 10a and the provided LVDS input signals may be shaped in waveform by the LVDS receiver. An ESD (Electro Static Discharge) protection element is preferably disposed at a pre-stage of the LVDS receiver. The LVDS receiving comparator 10a has an output terminal connected to an input terminal of a post-stage timing generating circuit 10b, and two input terminals, into which the differential signals are input.

The signals that are shaped in waveform by the LVDS receiver generate, at the comparator 10a, an ON/OFF signal (pulse signal) for making an LED 11 emit and not emit light. This pulse signal determines the timings of a main current for LED light emission, a rising peaking current (overshoot) and a falling undershoot current for high-speed operation of the LED at a current driving circuit and a peaking current driving circuit.

With LVDS, because differential signal data transmission in a single channel is enabled at a rate of several hundred to several thousand Mbps and because a low amplitude signal is output by a current mode driving circuit, ringing and switching spikes hardly occur and signal transmission of low noise can be performed with low consumption power across a wide frequency bandwidth. The differential signals are input into the LVDS receiving comparator 10a and the timing of driving the LED is generated by the timing generating circuit 10b according to the signal output from the output terminal of the LVDS receiving comparator 10a. LVDS applies an influence the final emission output of the LED and by employing this method, ringing and switching spikes of the emission output can be suppressed.

The LED driving circuit 10 includes a main current generating circuit (first current source) 10d connected to the LED 11, and a transistor 10c (in the figure, a plurality of transistors are indicated by a single block; besides MOS transistors, bipolar transistors may be used), controlling a driving current (mainly a steady-state forward current) that flows between the main current generating circuit 10d and the LED 11.

A driving signal T1 generated by the timing generating circuit 10b is applied to a control terminal of the transistor 10c. By applying the driving signal T1 from the timing generating circuit 10b to the control terminal of the transistor 10c, the driving current between the main current generating circuit 10d and the LED 11 can be controlled. The driving current flows from a power supply potential Vcc to the LED 11, the transistor 10c, the main current generating circuit 10d, and to the ground potential, and the LED 11 is made to emit light by this driving circuit.

A bias current of a fixed level also flows through the LED 11. The bias current flows from the power supply potential Vcc to the ground potential via the LED 11 and a bias current generating circuit 10h. For high-speed operation of the LED 11, the bias current is applied even during non-emission of the LED 11.

Several currents for correction are superposed onto the driving current.

That is, the LED driving circuit 10 has a first peaking current generating circuit 10e (second current source) connected to the LED 11, and the timing generating circuit 10b applies a driving signal T2 to a transistor 10c and thereby drives the first peaking current generating circuit 10e to make the first peaking current generating circuit 10e supply a first peaking current to the LED 11. In this case, because the first peaking current from the first peaking current generating circuit 10e, controlled by the timing generating circuit 10b, is superposed onto the driving current provided from the main current generating circuit to the LED 11, the rise of the driving current is made sharp and the LED emission output, according to the driving current, can be corrected for rounding.

Furthermore, the LED driving circuit 10 includes a second peaking current generating circuit 10f (third current source) connected to the LED 11, and the timing generating circuit 10b applies a driving signal to a transistor 10c and thereby drives the second peaking current generating circuit 10f to make the second peaking current generating circuit 10f supply a second peaking current to the LED 11. In this case, the second peaking current from the second peaking current generating circuit 10f, controlled by the timing generating circuit 10b is also superposed onto the driving current provided from the main current generating circuit to the LED 11. Therefore, although the driving current that has been made to rise sharply by the first peaking current falls to the steady-state level of the main current and the current waveform, only the first peaking current is not sufficient for correction with respect to a current waveform to be intentionally subject to waveform correction, and the depression of the LED emission output according to the driving current can also be corrected.

The driving signal T2 for providing the first peaking current rises in synchronization with the timing of rise of the driving signal T1 and has a shorter pulse width than the driving signal T1. The rise of the driving signal T3 for providing the second peaking current is delayed from the timing of rise of the driving signal T1 and has a shorter pulse width than the driving signal T1. Preferably, the pulse of the driving signal T2 and the pulse of the driving signal T3 are set so as not be overlapped in time. That is, preferably, the rise timing of the driving signal T3 is set later than the fall timing of the driving signal T2.

The LED driving circuit 10 further includes an undershoot current generating circuit 10g (fourth current source) connected to the LED 11, and the timing generating circuit 10b applies a driving signal T4 to a transistor 10c and thereby drives the undershoot current generating circuit 10g to make the undershoot current generating circuit 10g supply an undershoot current to the LED 11. In this case, because the undershoot current from the undershoot current generating circuit 10g, controlled by the timing generating circuit 10b, is also superposed onto the driving current from the main current generating circuit to the LED 11, the fall of the driving current is made sharp and the LED emission output according to the driving current can be corrected further for rounding.

The driving signal T4 for providing the undershoot current rises, substantially in synchronization with the fall timing of the driving signal T1, in a manner such that the respective driving currents due to the driving signals T1 and T4 are mutually opposite in direction and falls, at a timing later than the fall timing of the driving signal T1, in a manner such that the respective driving currents due to the driving signals T1 and T4 are mutually opposite in direction.

Each current generating circuit constitutes a current mirror circuit, and a temperature compensated current from a temperature compensated current generating circuit 10i is supplied to one of the lines thereof.

That is, the temperature compensated current generating circuit 10i applies a temperature compensated current $I_{T1}$ to the main current generating circuit 10d. Temperature fluctuation of the emission output, based on the driving current, is thereby compensated. That is, the lowering of the driving current and the emission output in accordance with temperature rise is compensated by superposition of the temperature compensated current $I_{T1}$ onto the driving current.

The temperature compensated current generating circuit 10i applies a temperature compensated current $I_{T2}$ to the first peaking current generating circuit 10e, a temperature compensated current $I_{T3}$ to the second peaking current generating circuit 10f, and the temperature compensated current $I_{T1}$ to the bias current generating circuit 10h in common to the main current generating circuit 10d. Temperature fluctuations of the emission output, based on the first and second peaking currents and the bias current, are thereby compensated. That is, fluctuations of these currents in accordance with temperature rise are compensated by superposition of the respective temperature compensated currents onto the first peaking current, the second peaking current, and the bias current.

The temperature compensated current generating circuit 10i performs control of the optical power of the LED. The temperature compensated current generating circuit 10i performs temperature detection using a thermal voltage provided by a BGR (band gap reference) circuit. This judges the temperature state of an elemental device upon setting several temperature ranges into which an entire temperature range, defined by specifications, is partitioned. Although with the present example, a case of partitioning into two temperature ranges shall be described, partitioning into three or more temperature ranges is also possible.

Figure 2:
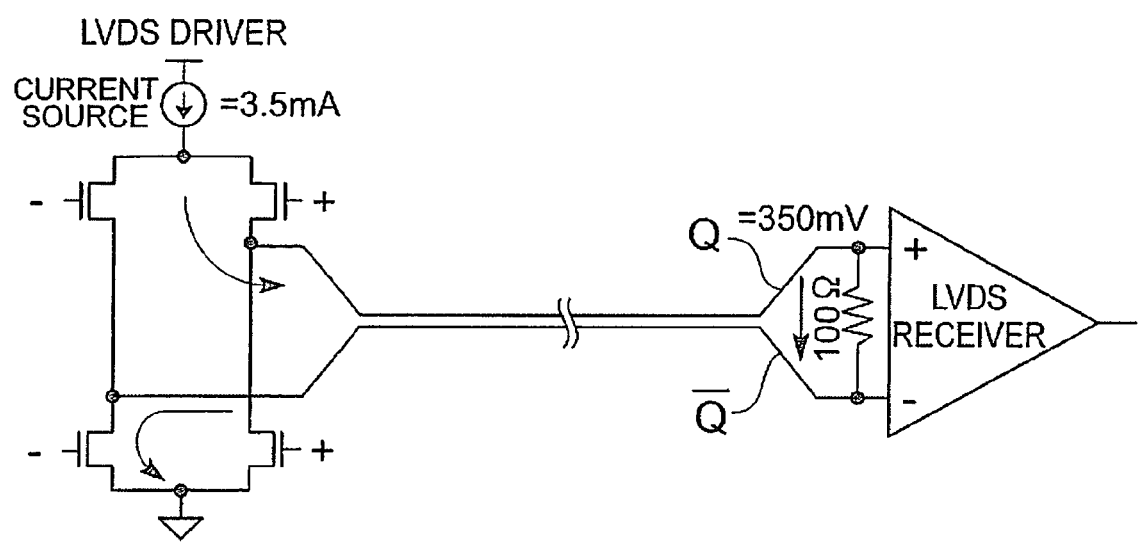
FIG. 2 is a circuit diagram of an LVDS driver.

At a tone detecting circuit 10j, when non-input of the LVDS signals (Q, Q-bar) (a state of both inputs being zero) is detected, a bias circuit 10k, which supplies a bias voltage to the respective circuits, is stopped to realize a low power consumption mode. Upon receiving a CMOS-level electrical signal input, a sleep circuit 10m stops the operations of the tone detecting circuit 10j, the temperature compensated current generating circuit 10i, and the bias circuit 10k to realize a state of substantially zero consumption current. This driving circuit 10 may also incorporate a DC level determining circuit that can determine DC levels of the LVDS input signals. FIG. 2 is a circuit diagram of an LVDS driver as an example.

LVDS is an art of transmitting video images, 3-D graphics, and image data from a camera to a PC or printer via a LAN (Local Area Network), telephone line, or satellite line connected to a household digital video recorder. LVDS is a method for performing data communications by ultrasmall amplitude differential signals through a single balanced cable or through two wiring patterns formed on a PCB (printed circuit board) and this differential data transmission method has a characteristic of hardly being affected by common-mode noise. With LVDS, because data transmission in a single channel is enabled at a rate of several hundred to several thousand Mbps and because a low amplitude signal is output by a current mode driving circuit, ringing and switching spikes hardly occur and signal transmission of low noise can be performed with low consumption power across a wide frequency bandwidth.

A representative LVDS driver is shown in the figure, and when transistors positioned at the upper right and the lower left of two lines branching from a current source are turned ON, a current flows in the direction of the arrows and a current flows into an input side load of an LVDS receiver. When transistors positioned at the upper left and the lower right are turned ON, a current flows through the input side load in the opposite direction. Logic inversion of 0 and 1 can be performed by the switching of these transistors.

Figure 3:
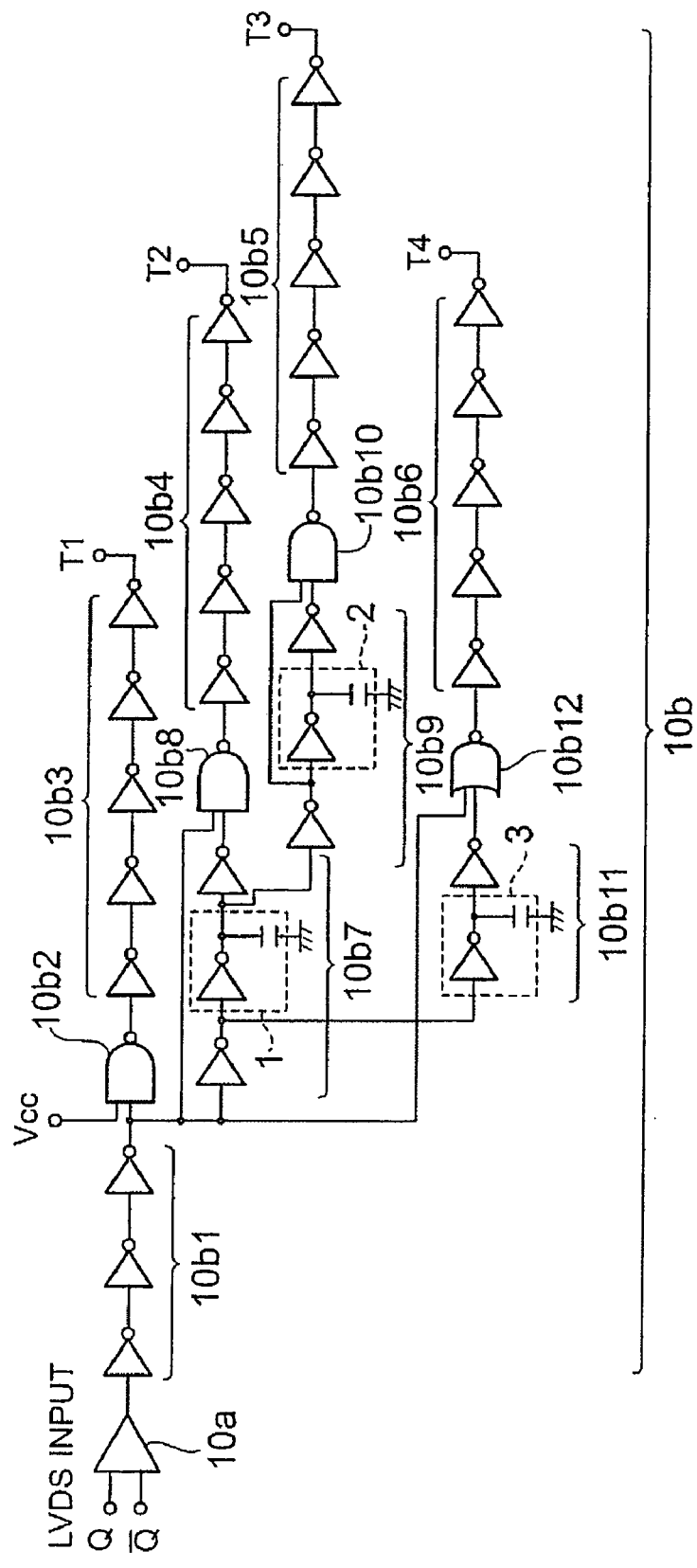
FIG. 3 is a circuit diagram of a timing generating circuit.

FIG. 3 is a circuit diagram of the timing generating circuit 10b.

LVDS input signals are applied from a PHY (physical layer) chip at a pre-stage of the present driving IC. The LVDS input signals are of differential form, and under the present specifications, each signal has a Vpp (peak-to-peak) amplitude centered about 1.8V DC of ±200 mV to ±800 mV. The LVDS differential input signals are converted into a single signal by means of the comparator 10a to generate a pulse that is to serve as a basis of the driving signal.

At a post-stage of the comparator 10a, three NOT circuits are disposed in succession to form a preamplifier 10b1, and the output of this preamplifier is input, along with a power supply potential Vcc, into a NAND circuit 10b2, and at a post-stage of the NAND circuit 10b2 is disposed a post amplifier 10b3, formed of five NOT circuits disposed in succession.

The output of the preamplifier 10b1 is input into a regulating circuit 10b7, the output of the regulating circuit 10b7 and the output of the preamplifier 10b1 are input into a NAND circuit 10b8, and the output of the NAND circuit 10b8 is input into a post amplifier 10b4.

The signal of the regulating circuit 10b7 before final output inversion is input into a regulating circuit 10b9, and the output after initial inversion of the regulating circuit 10b9 is input, along with the output of the regulating circuit 10b9, into the NAND circuit 10b10, and the output of the NAND circuit 10b10 is input into a post amplifier 10b5.

The output of the preamplifier 10b1 is input, upon inversion, into a regulating circuit 10b11 and input, along with the output of the regulating circuit 10b11 into a NOR circuit 10b12, and the output of the NOR circuit 10b12 is input into a post amplifier 10b6.

The five-stage NOT circuits 10b3, 10b4, 10b5, and 10b6 perform signal amplification for providing ideal waveforms and the outputs thereof respectively constitute the driving signals T1, T2, T3, and T4. The undershoot current driving signal T4 is input into a control terminal (gate) of a p-MOS transistor, and when the driving signal T4 is of a "L level," the undershoot current is supplied. In the present example, the transistor, into the gate of which the driving signal T4 is input, is a p-MOS transistor, and the transistors, into the gates of which the driving signals T1, T2, and T3 are input, are n-MOS transistors.

Figure 4:
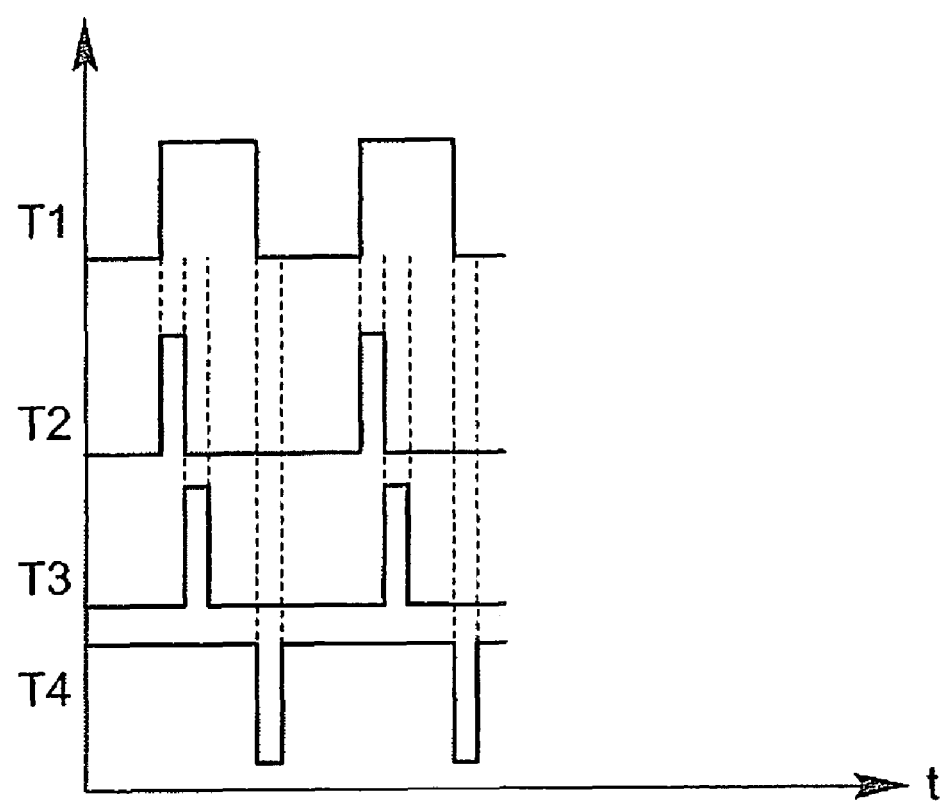
FIG. 4 is a timing chart of various driving signals.

FIG. 4 is a timing chart of various driving signals.

The manner in which the driving signals (timing pulses) T1, T2, T3, and T4 are generated in time series is illustrated. The pulses of the driving signal T2 and the pulses of the driving signal T3 are generated in succession in time series and also arranged so as not to be overlapped. Strictness of the condition of non-overlap of these pulses is not required in particular from the standpoint of securing stability of communications, and these pulses may overlap somewhat. The reverse-direction fall timing of the driving signal T4 that applies the undershoot current is positioned close to the fall timing of the driving signal T1. The magnitude of a driving signal is proportional to the magnitude of the driving current.

Figure 5:
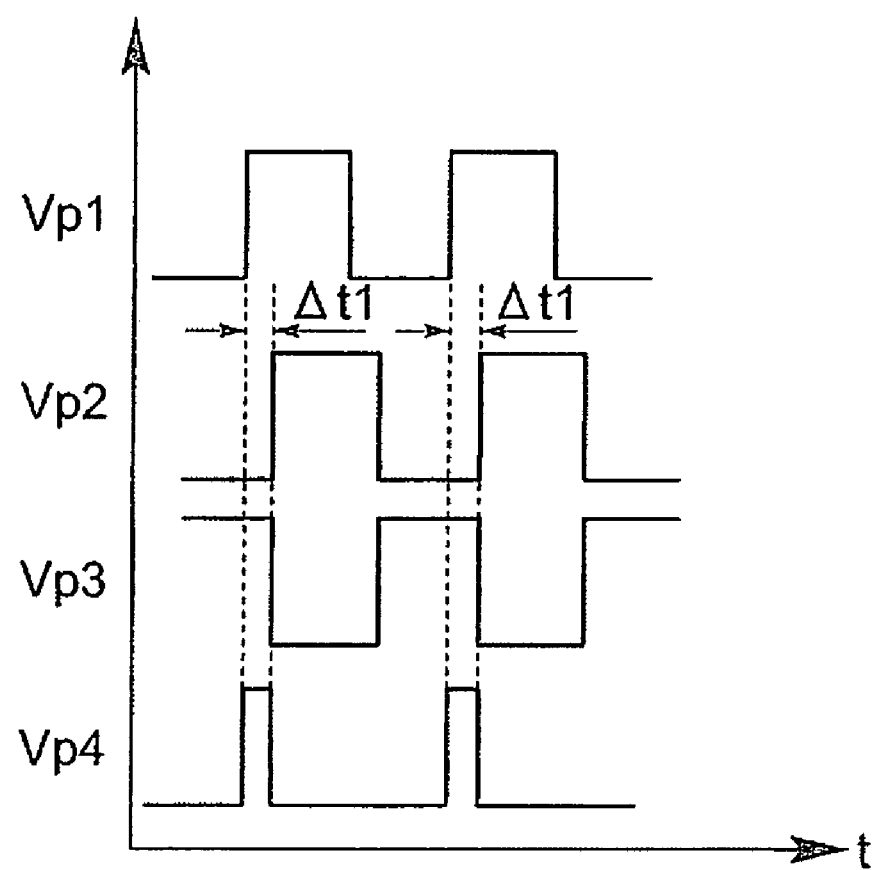
FIG. 5 is a timing chart of various voltages.

FIG. 5 is a timing chart of various voltages in the timing generating circuit.

The functions of the above-mentioned regulating circuits shall now be described. A voltage waveform Vp1, which is to be a basis, is output from the preamplifier 10b1. In a regulating circuit, an inverter, a NOT gate delay, and a capacitance are used to generate a voltage waveform Vp2 that is delayed with respect to the voltage waveform Vp1. A voltage waveform Vp3 is obtained by inversion of the voltage waveform Vp2. To obtain a voltage waveform Vp4, a NAND operation is performed on the waveforms of the voltage waveform Vp1 and the voltage waveform Vp3 and then an inversion is performed.

Thus to form the one-shot pulse voltage waveform Vp4 from the basic pulse of the voltage waveform Vp1, the basic pulse is delayed, inverted, and subject to a logic circuit that performs a NAND (or NOR) operation, etc., on the original basic pulse. This shall be the basic method.

There are several combinations that can realize the desired pulse. As a method for delaying the pulse besides the combination of a gate delay and a capacitance, a method for adjusting the number of gates or the capacitance can be cited or a counter may be used.

In the present example, the driving signals T2, T3, and T4 are generated by the above-described basic method. A predetermined delay amount Δt1, necessary for generating the driving signal T2, is prepared by using a gate delay. The gate delay is realized by a NOT circuit or other logic circuit that provides an inverted output. An inversion operation can thus be used not only for input inversion but also for waveform delay. By appropriate combination of a gate delay and a capacitance or, in some cases, without the use of a capacitance, the desired delay amount Δt1 can be generated to generate the delayed waveform Vp2 for the driving signal T2.

From the driving signal T1, a waveform delayed by Δt1 is formed via the NOT circuit and the capacitor in the regulating circuit 10b7, and by then performing the NAND operation with the original waveform, the driving signal T2 can be generated. In the surrounded portions indicated by the symbols 1, 2, and 3 in FIG. 3, delays of Δt1, Δt2, and Δt3 can be performed. That is, the timing pulse of the driving signal T3 is obtained by digitally processing a pulse, applied with the delay amount Δt1, and a pulse, with which the delay amount Δt2 is further applied to the pulse provided with the delay amount Δt1, at the NAND circuit 10b10. The timing pulse of the driving signal T4 is obtained by digitally processing a basic pulse, to which no delay amount is applied, and a pulse, with which the delay amount Δt3 is applied to the basic pulse that is not applied with a delay amount, at a NOR.

Figure 6:
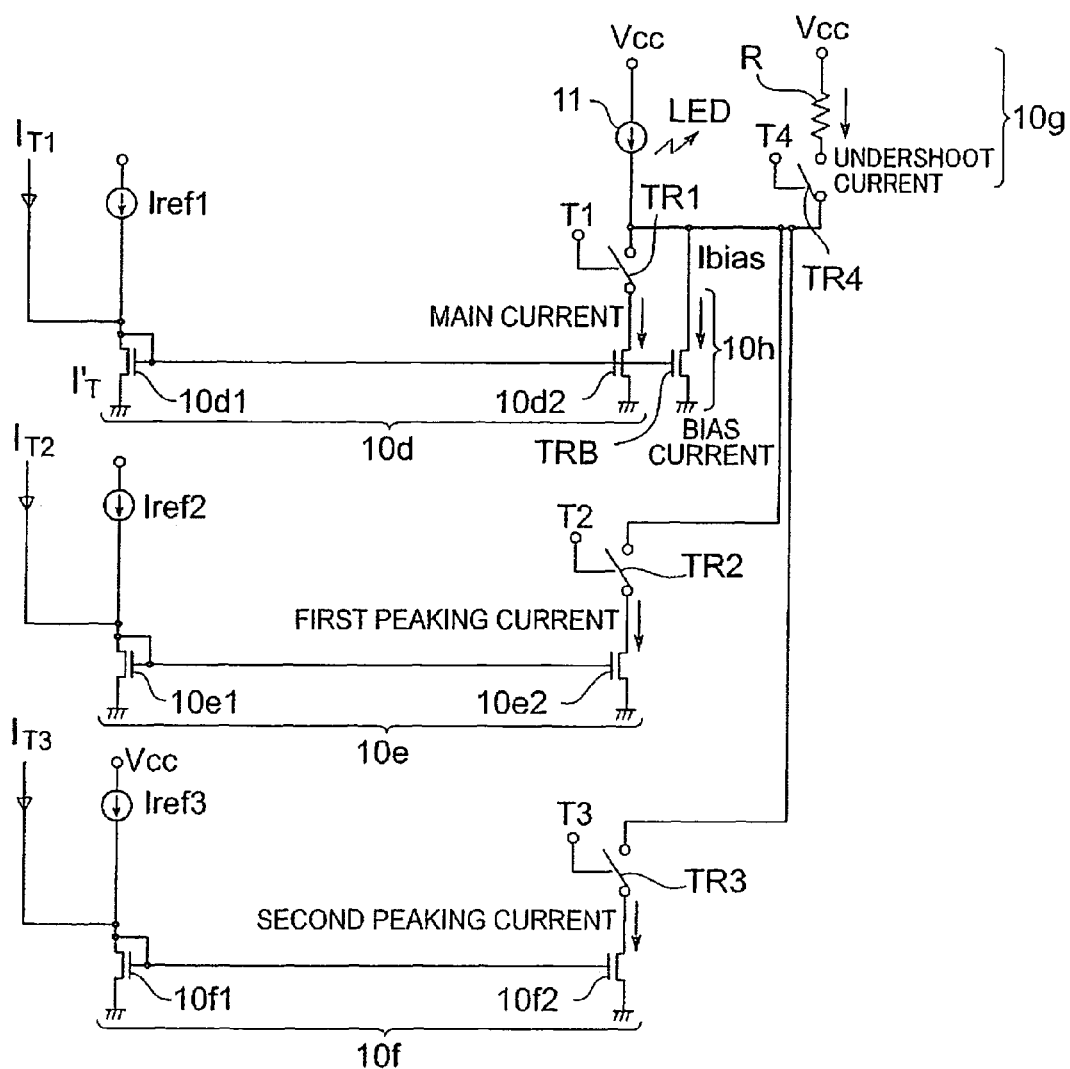
FIG. 6 is a circuit diagram of current generating circuits.

FIG. 6 is a circuit diagram of the current generating circuits. The driving signals T1, T2, T3, and T4 are input into control terminals (gates) of switching transistors TR1, TR2, TR3, and TR4 that are connected to a cathode of the LED 11. Ideally, the driving signals are digital signals of large amplitude spanning from Vcc to the ground potential.

The main current generating circuit 10d, the first peaking current generating circuit 10e, the second peaking current generating circuit 10f, and the bias current generating circuit 10h are disposed between the cathode side of the LED 11 and the ground potential.

The main current generating circuit 10d has a current mirror circuit, constituted of a pair of transistors 10d1 and 10d2, and has the switching transistor (which is a MOS type transistor in the present example) TR1 (10c) on its output side (mirror side) line. A current from a current source Iref1 and the temperature compensated current $I_{T1}$ are supplied to an input side (reference side) line of the current mirror circuit.

In the current mirror circuit, currents that are in a proportional relationship flow in the input side line and the output side line. That is, the current that is the sum of the reference current and the temperature compensated current $I_{T1}$ flows to the transistor 10d2, and the temperature compensated driving current flows to the LED 11 by the driving of the transistor TR1 by the driving signal T1.

The first peaking current generating circuit 10e has a current mirror circuit, constituted of a pair of transistors 10e1 and 10e2, and has the switching transistor (which is a MOS type transistor in the present example) TR2 (10c) on its output side (mirror side) line. A current from a current source Iref2 and the temperature compensated current $I_{T2}$ are supplied to an input side line of the current mirror circuit.

The current that is the sum of the reference current and the temperature compensated current $I_{T2}$ thus flows to the transistor 10e2, and the temperature compensated first peaking current flows to the LED 11 by the driving of the transistor TR2 by the driving signal T2.

The second peaking current generating circuit 10f has a current mirror circuit, constituted of a pair of transistors 10f1 and 10f2, and has the switching transistor (which is a MOS type transistor in the present example) TR3 (10c) on its output side (mirror side) line. A current from a current source Iref3 and the temperature compensated current $I_{T3}$ are supplied to an input side line of the current mirror circuit.

That is, the current that is the sum of the reference current and the temperature compensated current $I_{T3}$ thus flows to the transistor 10f2, and the temperature compensated second peaking current flows to the LED 11 by the driving of the transistor TR3 by the driving signal T3.

The bias current generating circuit 10h has a transistor TRB (10c), having a gate in common with the transistor 10d2 for the main current and constituting a current mirror with the transistor 10d1. The bias current generating circuit 10h supplies a bias current Ibias for improving the response property of the LED 11. Because the bias current generating circuit 10h constitutes a current mirror circuit, the temperature compensated current $I_{T1}$ is supplied and a temperature compensated bias current flows through the transistor TRB.

The undershoot current generating circuit 10g is constituted of the transistor TR4 and a resistor R connecting the power supply potential Vcc to the cathode of the LED 11, and the driving signal T4 is applied to the control terminal of the transistor TR4. By the driving of the transistor TR4, the undershoot current is supplied to the LED 11.

In regard to the main current and the peaking currents in the present example, current sources Iref1, Iref2, and Iref3, which supply the currents that flow through the transistors at the input sides of the current mirror circuits, are set up, the currents are amplified at the output side (mirror side), and the mirror amplified currents are switched ON/OFF by the transistors TR1, TR2, and TR3. The same form of control as that of the peaking current generating circuits may also be carried out at the undershoot current generating circuit 10g.

The temperature compensated currents $I_{T1}$, $I_{T2}$, and $I_{T3}$ flow into the lines at the current supply source Iref1, Iref2, and Iref3 side, and on the input side lines of the current mirror circuits, the BGR voltage and resistors that are adjusted in temperature characteristics are used to perform constant current supplying that is hardly influenced by temperature and power supply voltage fluctuations.

Figure 7:
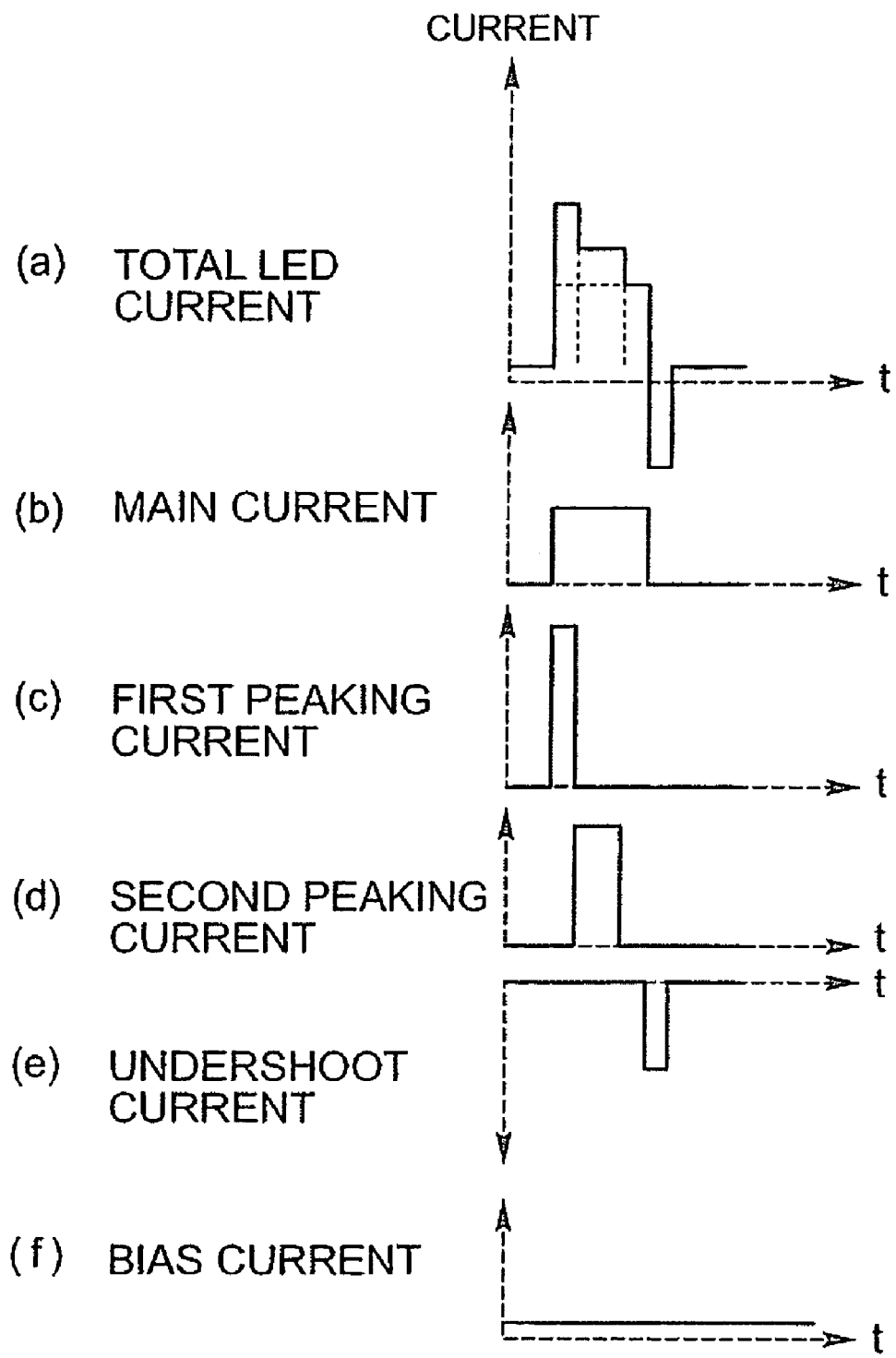
FIG. 7 are a timing chart of driving currents.

FIG. 7 is a timing chart of the driving currents.

The total LED current supplied to the LED 11 is as shown in FIG. 7(a). The main current supplied to the LED 11 according to the driving signal T1 is a rectangular wave as shown in FIG. 7(b), and if just this is used as the driving current, the emission output waveform is rounded. The first peaking current (FIG. 7(c)), supplied to the LED 11 according to the driving signal T2, is a one-shot pulse that is present near the rise time of the main current.

The second peaking current (FIG. 7(d)), supplied to the LED 11 according to the driving signal T3, is delayed with respect to the first peaking current, and in this figure, is wide in pulse width. The undershoot current (FIG. 7(e)), supplied to the LED 11 according to the driving signal T4, is opposite in direction from the other currents, is further delayed than the second peaking current and falls near the fall of the main current. The magnitude of the driving current is proportional to the magnitude of the driving signal. A crest value of the first peaking current is higher than a crest value of the second peaking current and can correct the lowering of the optical output according to the waveform.

The bias current (FIG. 7(f)) which is supplied to the LED 11, regardless of whether or not the LED 11 is lit, is determined based on the extinction ratio of the LED and this value may be designed and adjusted as appropriate.

Figure 8:
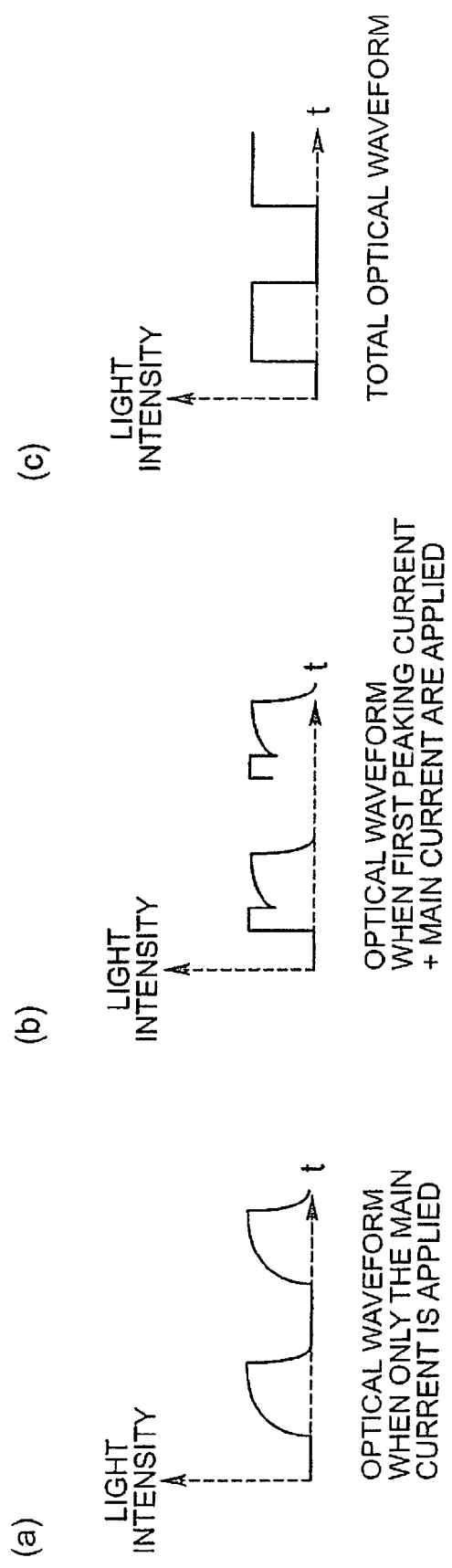
FIG. 8 are graphs showing optical intensity waveforms.

FIG. 8 are graphs showing optical intensity waveforms.

FIG. 8(a) is a graph of an optical waveform that is obtained when only the main current is applied, FIG. 8(b) is a graph of an optical waveform that is obtained when the main current and the first peaking current are applied, and FIG. 8(c) is a graph of an optical waveform when the total LED current is applied to the LED.

There is unevenness among the characteristics of an LED. In particular, when peaking is applied to make the response of an LED fast, depression of the optical waveform, such as shown in FIG. 8(b), occurs.

When the second peaking current is not applied to the LED 11 and only the first peaking current is applied to the LED, the depression cannot be suppressed and the optical output cannot be readily adjusted with the driving current in which the main current and the first peaking current are superposed. Thus by further superposing the second peaking current onto the first peaking current, the effect of suppressing the depression is exhibited as shown in FIG. 8(c).

Figure 9:
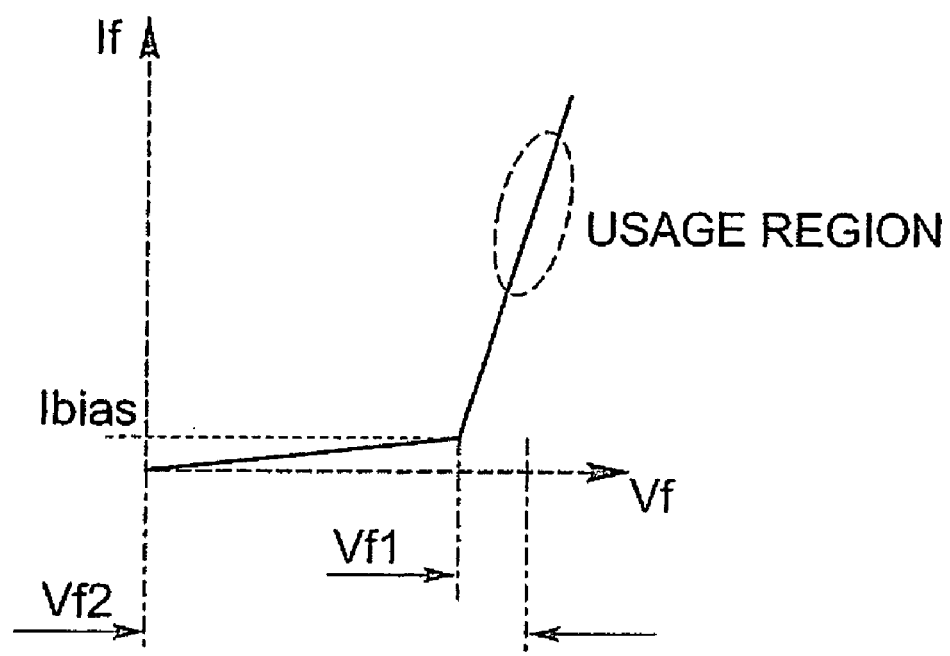
FIG. 9 is a graph of V-I characteristics of an LED.

FIG. 9 is a graph of V-I characteristics of an LED. The abscissa indicates a voltage Vf and the ordinate indicates a current If.

The bias current (Ibias) is supplied to the LED 11 to ensure a high-speed switching operation. As shown in the figure, in order to obtain a voltage Vf2 for light emission of the LED 11, the voltage is not varied from a base voltage value (for example, 0V), but a predetermined voltage Vf1 is applied to the LED 11 in advance, and by then applying a driving signal current, corresponding to the driving signal (a binary optical transmission signal) to the LED 11, the optical output necessary for communications can be obtained in an ultrashort time and high-speed switching can be realized.

Figure 10:
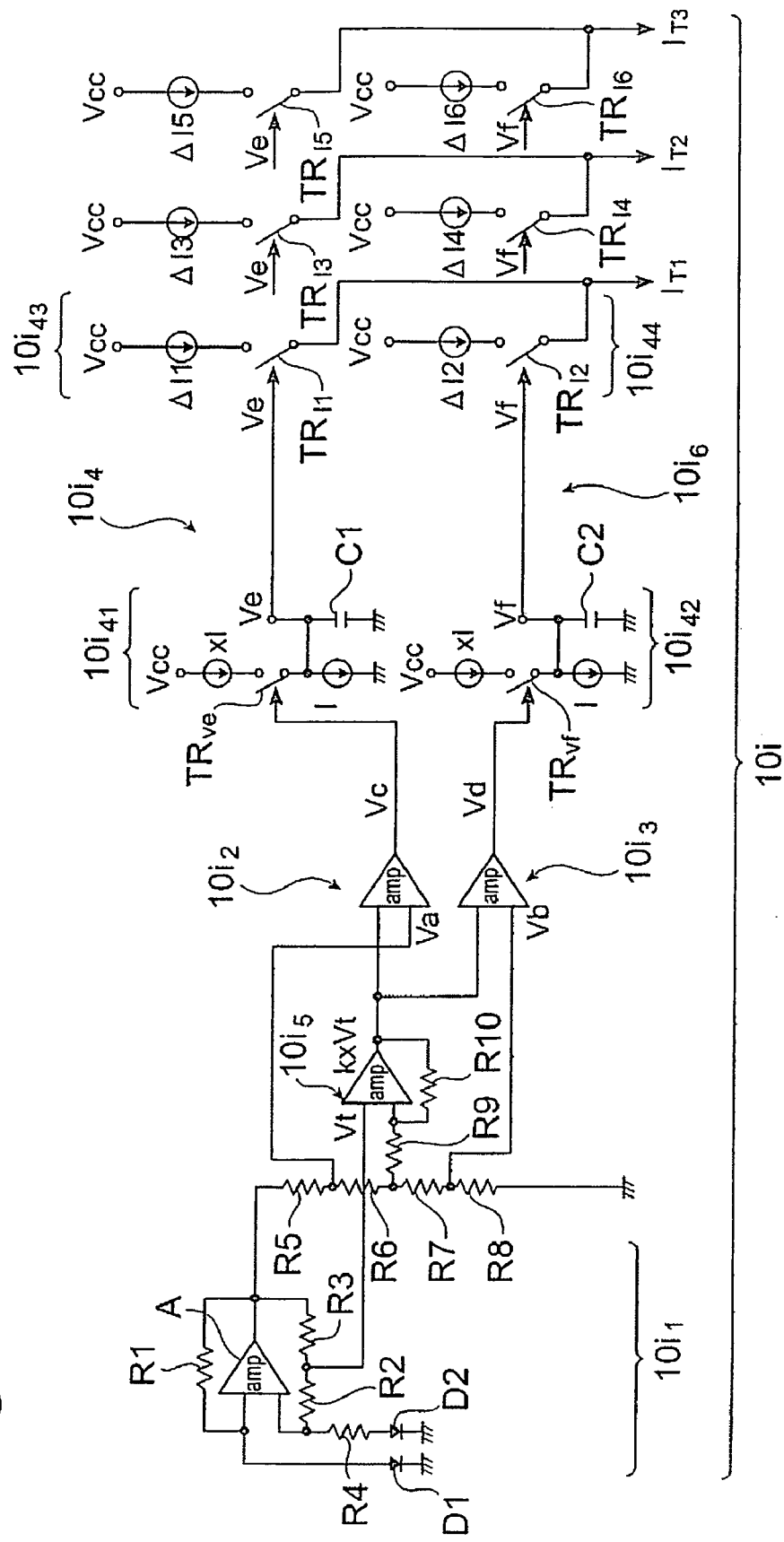
FIG. 10 is a circuit diagram of a temperature compensated current generating circuit.

FIG. 10 is a circuit diagram of the temperature compensated current generating circuit.

The temperature compensated current generating circuit $10i$ has a temperature detecting circuit $10i_1$, a first comparator $10i_2$, into which the output of the temperature detecting circuit $10i_1$ is input, and a first current increasing circuit $10i_4$, which gradually increases the temperature compensated current from a point in time of output switching of the first comparator $10i_2$. The comparator $10i_2$ and $10i_3$ portions of the temperature compensated current generating circuit $10i$ perform A/D conversions for supplying current values, set in advance based on the temperature information detected by the temperature detecting circuit $10i_1$, to the respective current generating circuits.

The temperature detecting circuit $10i_1$ is constituted of a BGR circuit and has diodes D1 and D2, respectively connected to two input terminals of an amplifier A. One input terminal of the amplifier A is connected via a resistor R1 to an output terminal, and a junction potential of R2 and R3, connecting the output terminal and the other diode D2, is input as a detected temperature voltage (thermal voltage) Vt into a post amplifier $10i_5$. A resistor R4 is interposed between the diode D2 and the input terminal of the amplifier A.

Resistors R5, R6, R7, and R8 are interposed between the output terminal of the amplifier A and the ground potential, the junction potential of the resistors R5 and R6 is a reference potential Va, and the junction potential of the resistor R7 and the resistor R8 is a reference potential Vb. The junction potential of the resistor R6 and the resistor R7 is input into the other input terminal of the amplifier $10i_5$ via a resistor R9, and a resistor R10 is interposed between this input terminal and an output terminal of the amplifier $10i_5$.

The output (detected temperature voltage Vt) of the temperature detecting circuit $10i_1$ is input into the first comparator (a hysteresis comparator in the present example) $10i_2$, and the output of the first comparator $10i_2$ switches at a set temperature. The detected temperature voltage Vt is proportional to the temperature. The detected temperature voltage that has been multiplied by k (k×Vt) by the amplifier $10i_5$ is input into the first comparator $10i_2$. The reference potential Va formed by the temperature detecting circuit $10i_1$ is input along with the detected temperature voltage into the first comparator $10i_2$. When the detected temperature voltage k×Vt exceeds the reference potential Va, an output voltage Vc of the first comparator $10i_2$ is input into a first slow regulating unit $10i_{41}$ that performs smoothing of the input voltage.

The first current increasing circuit $10i_4$ is constituted of the first slow regulating unit $10i_{41}$ and a post-stage first supplying circuit $10i_{43}$. From the point in time of output switching of the first comparator $10i_2$, that is, when the set temperature exceeding the reference potential Va is attained, gradually increases a temperature compensated current $I_{T1}$ (ΔI1) and thereby suppresses the lowering of the emission output. Here, by gradually increasing the temperature compensated current $I_{T1}$ by making use of charging/discharging functions of a capacitor, etc., that is, by increasing the temperature compensated current $I_{T1}$ over a longer time than a pulse width that a photodetecting element, onto which light from the LED 11 is made incident, can respond within, pulse width distortion and jitter are suppressed and the driving current and the emission output are also prevented from becoming excessive due to lowering of the temperature.

The first current increasing circuit $10i_4$ includes a first capacitor C1 that varies the voltage from the point in time of output switching of the first comparator $10i_2$, and a first current controlling transistor $TR_{f1}$, having a control terminal into which a voltage Ve of the first capacitor C1 is input and applying at least a portion of the temperature compensated current $I_{T1}$.

The voltage Ve is set so that the transistor $TR_{f1}$ is made to operate by charges from a current source xI being accumulated in the first capacitor C1 by the application of the output Vc of the first comparator $10i_2$ to a control terminal of a transistor $TR_{Ve}$ or by the charges accumulated in the first capacitor C1 being discharged via a current source I. As the transistors, p-type MOS transistors may be used.

Although the output voltage Vc of the comparator $10i_2$ is indirectly applied to the capacitor C1, it can be directly applied as long as the voltage Ve increases gradually. That is, the input voltage Ve into the control terminal of the transistor $TR_{f1}$ may be generated and the current ΔI1 that flows through the transistor $TR_{f1}$ may be formed by directly applying the output voltage Vc to the capacitor C1 and disposing a suitable circuit at a post-stage side.

The temperature compensated current generating circuit $10i$ includes the second comparator (a hysteresis comparator in the present example) $10i_3$, into which the output of the temperature detecting circuit $10i$ is input, and a second current increasing circuit $10i_6$, which gradually increases a temperature compensated current $I_{T1}$ (ΔI2) from a point in time of output switching of the second comparator $10i_3$.

The output (detected temperature voltage Vt) of the temperature detecting circuit $10i_1$ is input into the second comparator $10i_3$, and at a set temperature, the output of the second comparator $10i_3$ switches. The detected temperature voltage that has been multiplied by k (k×Vt) by the amplifier $10i_5$ is input into the second comparator $10i_3$. The reference potential Vb formed by the temperature detecting circuit $10i_1$ is input along with the detected temperature voltage into the second comparator $10i_3$. When the detected temperature voltage k×Vt exceeds the reference potential Vb, an output voltage Vd of the second comparator $10i_3$ is input into a second slow regulating unit $10i_{42}$ that performs smoothing of the input voltage.

The second current increasing circuit $10i_6$ is constituted of the second slow regulating unit $10i_{42}$ and a post-stage second supplying circuit $10i_{44}$ and, from the point in time of output switching of the second comparator $10i_3$, that is, when the set temperature exceeding the reference potential Vb is attained, gradually increases the temperature compensated current $I_{T1}$ (ΔI2) and thereby suppresses the lowering of the emission output. Here, by gradually increasing the temperature compensated current $I_{T1}$ (ΔI2) by making use of charging/discharging functions of a capacitor, etc., that is, by increasing the temperature compensated current $I_{T1}$ (ΔI2) over a longer time than the pulse width that the photodetecting element, onto which light from the LED 11 is made incident, can respond within, pulse width distortion and jitter are suppressed.

The second current increasing circuit $10i_6$ includes a second capacitor C2 that varies the voltage from the point in time of output switching of the second comparator $10i_3$, and a second current controlling transistor $TR_{f2}$, having a control terminal into which a voltage Vf of the second capacitor C2 is input and applying at least a portion of the temperature compensated current $I_{T1}$.

The voltage Vf is set so that the transistor $TR_{f2}$ is made to operate by charges from a current source xI being accumulated in the second capacitor C2 by the application of the output Vd of the second comparator $10i_3$ to a control terminal of a transistor $TR_{Vf}$ or by the charges accumulated in the second capacitor C2 being discharged via a current source I.

Although the output voltage Vd of the comparator $10i_3$ is indirectly applied to the capacitor C2, it can be directly applied as long as the voltage Vf increases gradually. That is, the input voltage Vf into the control terminal of the transistor $TR_{f2}$ may be generated and the current ΔI2 that flows through the transistor $TR_{f2}$ may be formed by directly applying the output voltage Vd to the capacitor C2 and disposing a suitable circuit at a post-stage side.

The output currents ΔI1 and ΔI2 of the first current increasing circuit $10i_4$ and the second current increasing circuit $10i_6$ are superposed to constitute the temperature compensated current $I_{T1}$. The temperature compensated current $I_{T1}$ may include other components. The reference potentials Va and Vb of the first comparator $10i_2$ and the second comparator $10i_3$ are set according to different set temperatures, and the control target value of the temperature compensated current $I_{T1}$ can thereby be set in two steps. A larger number of steps can be set for the control target value of the temperature compensated current by increasing the number of comparators.

The temperature compensated currents $I_{T2}$ and $I_{T3}$ are constituted of currents ΔI3+ΔI4 and currents ΔI5+ΔI6, respectively.

The current ΔI3 can be generated by inputting the voltage Ve into a control terminal of a transistor $TR_{f3}$ and thereby turning ON the transistor $TR_{f3}$.

The current ΔI4 can be generated by inputting the voltage Vf into a control terminal of a transistor $TR_{f4}$ and thereby turning ON the transistor $TR_{f4}$.

The current ΔI5 can be generated by inputting the voltage Ve into a control terminal of a transistor $TR_{f5}$ and thereby turning ON the transistor $TR_{f5}$.

The current ΔI6 can be generated by inputting the voltage Vf into a control terminal of a transistor $TR_{f6}$ and thereby turning ON the transistor $TR_{f6}$.

The method for generating the voltages Ve and Vf are as described above.

The degree of current compensation performed according to the temperature compensating switching is determined by the magnitudes of ΔI1 and ΔI2 (ΔI3, ΔI4, ΔI5, and ΔI6). Although these values are fixed values, these can be adjusted readily by mask redesign. In the present example, a circuit configuration, with which adjustments can be made as appropriate according to the characteristics of the LED, is employed in view of the unevenness of the characteristics of the LED.

With the above arrangement, control of the driving current of the LED is classified according to switching temperatures (temperatures, at each of which the detected temperature voltage Vt becomes equal to the reference potential Va or Vb) and the temperature ranges (temperature ranges partitioned by the switching temperatures) for temperature compensation of the LED optical output, and digitalization is employed in temperature compensating switching so that adjustment by mask modification can be performed readily in accordance with LEDs that differ in characteristics and simplification and minimization of the circuit configuration can be achieved. Also to prevent bit error (communication error) with respect to a receiving element when the driving current of the LED increases or decreases suddenly due to an unillustrated judging circuit, the LED current is slowly manipulated to increase and decrease.

The current source xI generates a current of x times that of the current source I. The capacitors C1 and C2, connected in parallel to the fixed current source I, can accumulate and discharge charges according to the current amount. For example, the fixed current source of the capacitor C1 is assumed to be x=2. By thus making a fixed current of 2 times that of current source I flow, and when the transistor $TR_{ve}$ closes (ON), a current of 1 times the current of current source I flows into the fixed current source I and the remaining current of 1 times the current of current source I becomes accumulated in the capacitor C1. When the transistor $TR_{ve}$ opens (OFF), the charges accumulated in the capacitor C1 are taken up by the fixed current I of 1 times the current of the fixed current source I, and by such accumulation and discharge of charges being repeated, the voltage Ve can be made to undergo a voltage variation that is sloped with respect to the time axis only during the time of charging or discharging. The same applies to the capacitor C2 and the variation of the voltage Vf. The frequency of the slope of the voltage is set to no more than the minimum response frequency of the receiving element, that is, to a level such that the receiving element cannot respond to the corresponding frequency component. Voltage slope adjustments of the voltages Ve and Vf can be performed by adjusting the fixed current sources and the capacities of the capacitors.

The voltages Ve and Vf are input simultaneously into the gates of the switch MOS transistors $TR_{f1}$ to $TR_{f6}$ that determine the bias current, the main current, and the peaking currents, and the adjustment to no more than the response frequency of the receiving element is also influenced by the sizes of these switch MOS transistors.

Figure 11:
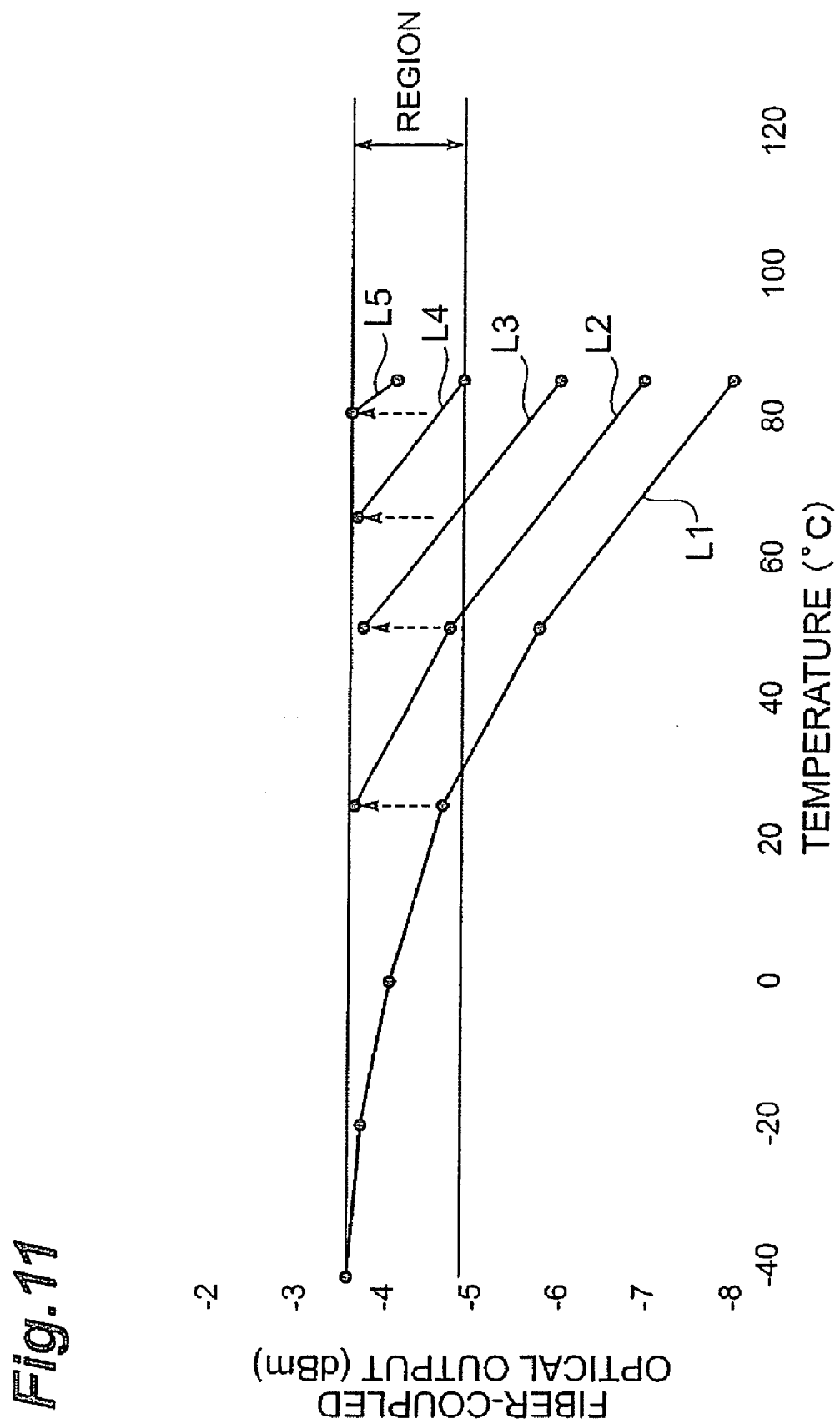
FIG. 11 is a graph of a relationship between temperature (° C.) and fiber-coupled output (dBm)

FIG. 11 is a graph of a relationship between temperature (° C.) and fiber-coupled output (dBm).

An output range REGION indicates a fiber-coupled optical output range that is required to prevent optical communication errors (the fiber-coupled optical output range with respect to temperature variation that is required for IC design as determined by a standard range defined by specifications).

Data L1 indicate fiber-coupled optical output characteristics when the above-described temperature compensation is not performed. The dotted-line arrows indicate that by performing switching of the LED current at predetermined temperatures, the fiber-coupled optical output increases. Data L2 to L5 indicate fiber-coupled optical output temperature characteristics after performing the temperature compensation indicated by the dotted-line arrows.

The LED has predetermined temperature characteristics as indicated by the data L1. Because in an optical communications application, the fiber-coupled optical output must be maintained within a range in which communication is not severed, the fiber-coupled optical output is temperature compensated as indicated by the dotted-line arrows.

Temperature compensation of the LED optical output is applied to the current source selecting portion of the LED current output stage circuit via the temperature detection, the A/D conversion and the slowing operation. The above-described multistep switching of the comparator output is performed so that the emission output increases in accordance with temperature rise, that is, so that the coupled optical output becomes as indicated by L2 to L5 in the figure. If the allowable output range REGION becomes narrow, the slice levels Va, Vb . . . and the number of comparators into which these levels are input are increased. For example, for use in a vehicle-mounted optical link, because the temperature of the external environment varies in the range of approximately −40° C. to +105° C., the number of slice levels and, likewise, the number of comparators are set accordingly.

Figure 12:
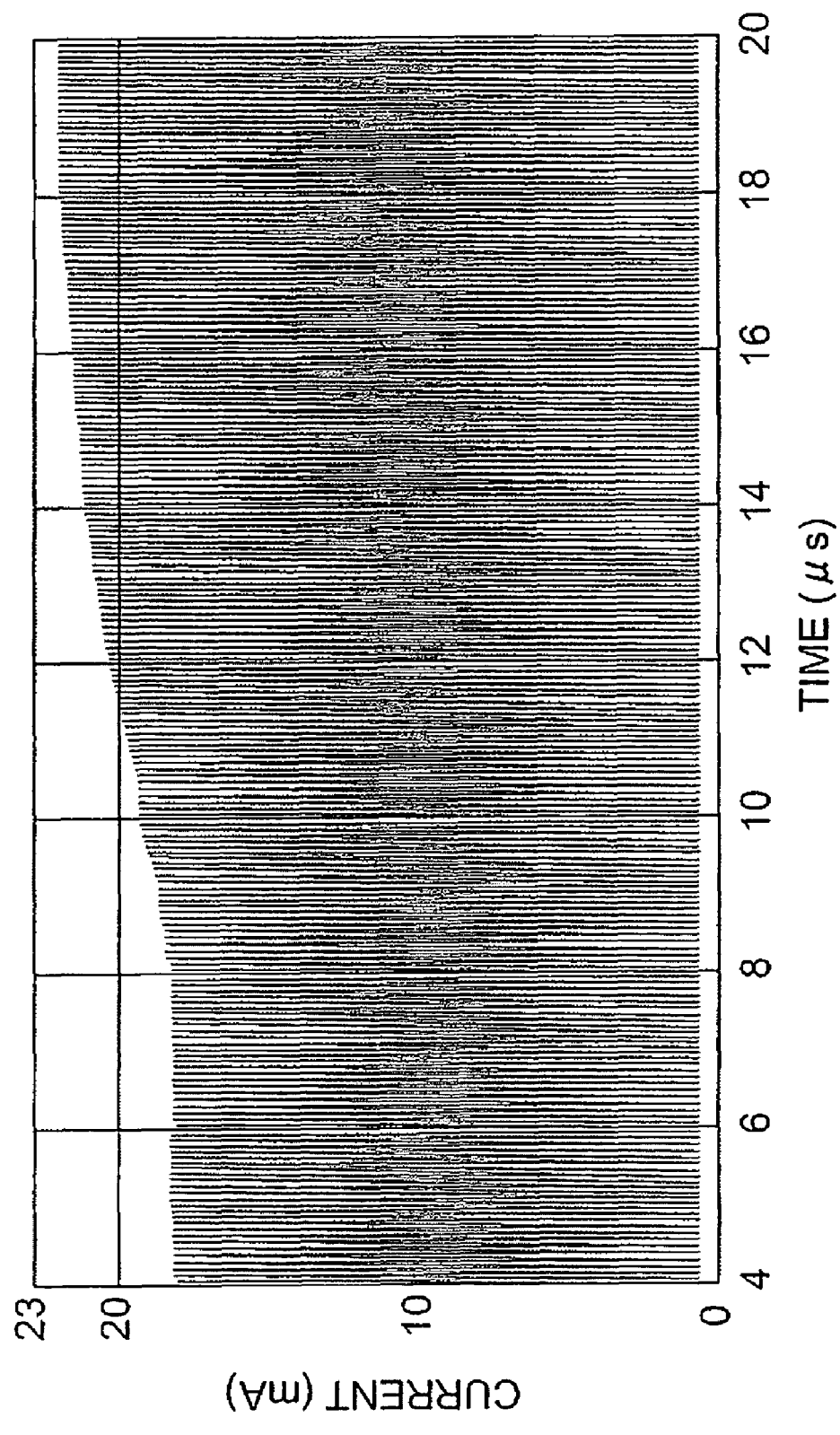
FIG. 12 is a graph of a relationship between time (μs) and driving current (mA) during signal application.

FIG. 12 is a graph of a relationship between time (μs) and driving current (mA) during signal application. This figure shows the results of monitoring (simulating) the current generated from the main current generating circuit during LED current switching according to temperature. It can be seen that the main current (driving current) rises slowly from the left end to the right end of the graph. By intentionally performing such an operation, pulse width distortion and jitter at the receiving side can be suppressed and communication errors can be effectively prevented.

Specifically, in this example, the minimum receiving-side response pulse width used for optical communications is presumed to be 2 μs as an effective value and the time for slow increase is set to approximately 10 μs. The same temperature control as that of the main current generating circuit is applied to the peaking current generating circuit and the bias circuit. In the present embodiment, the time from the start of LED current switching (time at which k×Vt exceeds Va) to completion of the predetermined LED current increase/decrease was calculated, for example, based on the minimum response frequency of 100 kHz of the receiving element and set to 10 μs.

Figure 13:
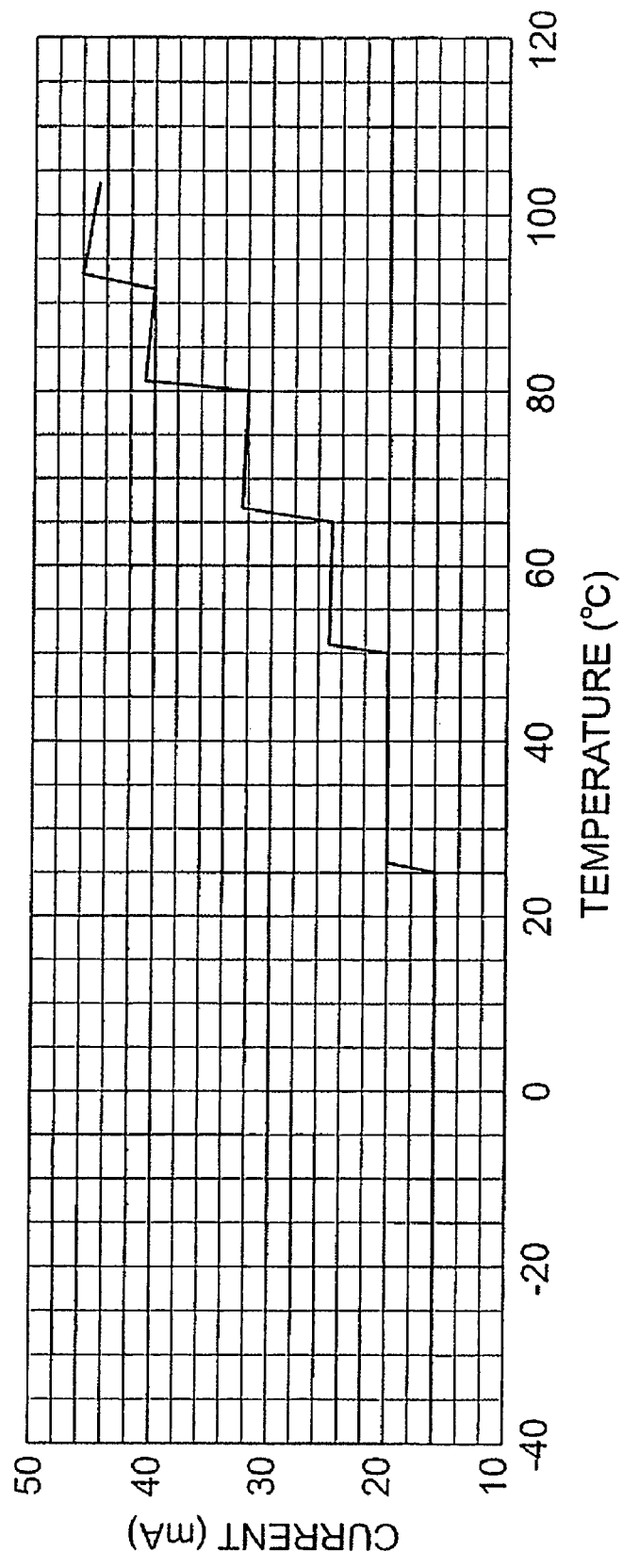
FIG. 13 is a graph of a relationship between temperature (° C.) and DC level driving current (mA)

FIG. 13 is a graph of a relationship between temperature (° C.) and DC level driving current (mA).

A state in which the LED driving current is varied in a stepwise manner to compensate the optical output of the LED is shown. With such a variation, it is desirable to provide a current increasing circuit that slowly varies the temperature compensated current as in the present invention because degradation of characteristics, such as the above-described pulse width distortion and jitter, occurs otherwise.

Figure 14:
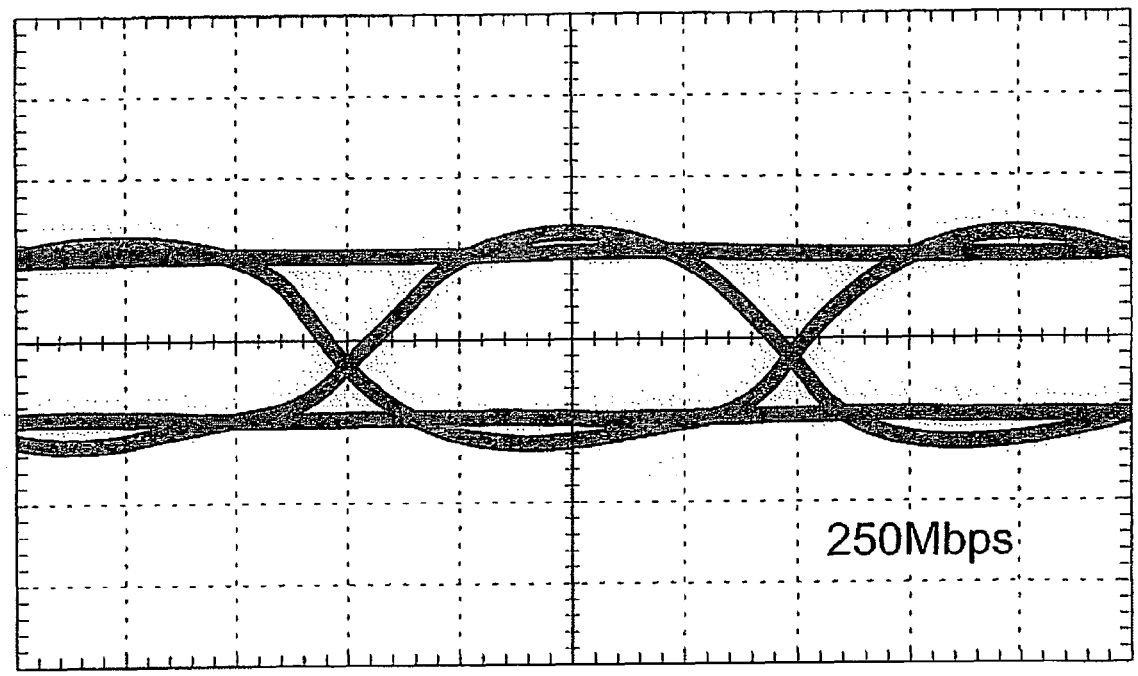
FIG. 14 is a waveform diagram of an eye pattern.

FIG. 14 is a waveform diagram of an eye pattern.

At the receiving side, in order to put the eye pattern of the output waveform, determined by specifications, within standards or to reduce the pulse width distortion and jitter to within the standards of the receiving element, arrangements are made to keep variations of the LED's fiber-coupled optical output at no more than the minimum response of the receiving element. For example, when the LED's fiber-coupled optical power increases suddenly and this is within the response range of the receiving element, the amplitude in the ordinate direction of the eye pattern increases accordingly. Although when there is a sudden change of amplitude, this is manifested as pulse width distortion or jitter at the receiving side, this phenomenon is suppressed as much as possible by the above-described arrangement. In the waveform diagram, one division of the abscissa corresponds to ins and one division of the ordinate corresponds to 500 mv.

Figure 15:
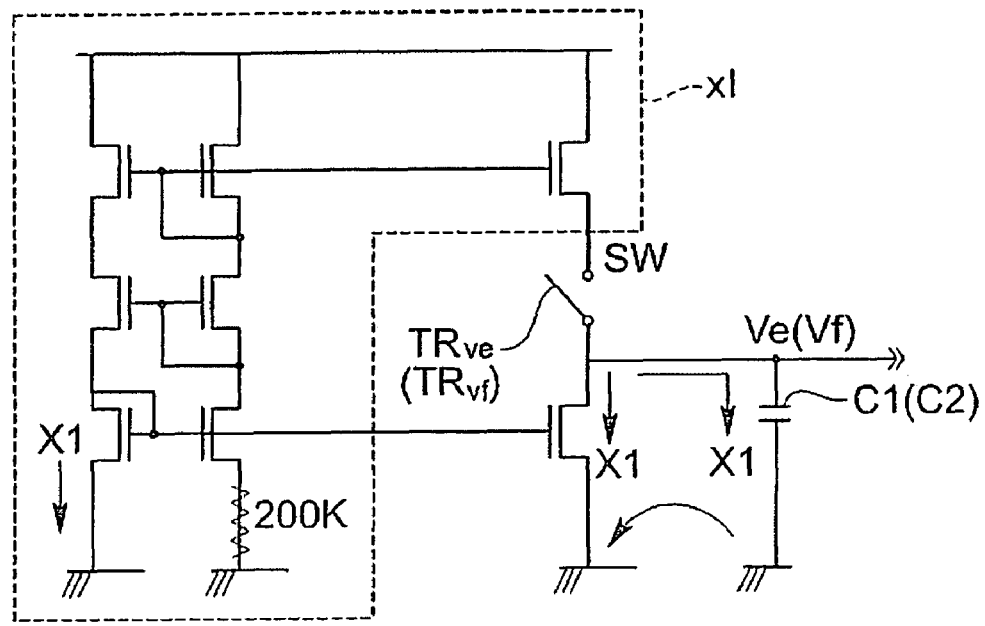
FIG. 15 is a partial circuit diagram of the temperature compensated current generating circuit.

FIG. 15 is a partial circuit diagram of a temperature compensated current generating circuit.

By applying the transistor (MOS transistor) $TR_{ve}$, which performs the switching of the LED driving current, with the time taken to discharge the charges accumulated in the capacitor C1, the driving current is slowly increased. Normally, the transistor $TR_{ve}$ is closed and a current X1 flows as shown in the figure and the potential Ve is in a "H level" state. When the comparator output Vc is applied as the switching signal to the gate of the transistor $TR_{ve}$, the transistor is turned OFF, the charges in the capacitor C1 become discharged, the potential Ve is put in an "L level" state. In this case, a post-stage transistor may be set to become ON at the L level.

Figure 16:
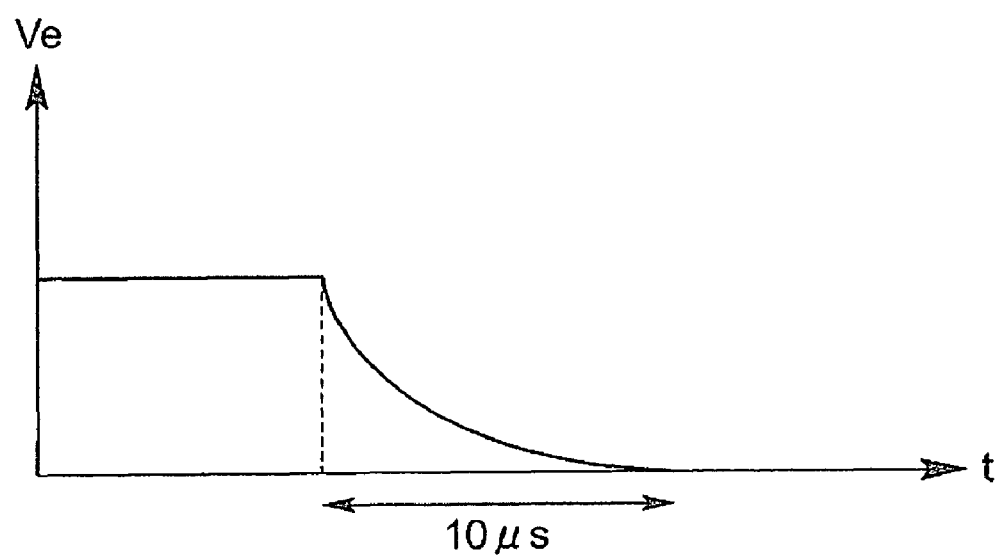
FIG. 16 is a graph of temporal change in voltage in accordance with discharge of a capacitor.

FIG. 16 is a graph of temporal change in voltage in accordance with discharge of the capacitor.

When discharge of the capacitor C1 is started, the potential Ve gradually decreases with the elapse of time. By adjusting the capacitance of the capacitor C1, the slow voltage variation can be further adjusted. Depending on the type of the transistor $TR_{ve}$, a slow voltage variation can be realized by changing the magnitude of the resistance to adjust the current amount. Although the case of the transistor $TR_{ve}$ and the capacitor C1 is described here, the same applies to the transistor $TR_{vf}$ and the capacitor C2. Also, although with the example of the current source xI, a plurality of transistors are connected as shown in the figures, any of various other arrangements may be employed instead.

As described above, with the present LED driving circuit, by using a voltage value that is generated in proportion to temperature variation, a digital output according to temperature is generated through an A/D converter constituted from one (or a plurality of) comparator(s) and the LED driving current amount is selected based on this digital output, and the conditions for varying the LED driving current amount based on temperature variation are considered for the optical communication system of the sending and receiving pair so that the LED driving current amount is varied slowly over a time longer than the pulse width in which the receiving element responds to enable reduction of pulse width distortion and jitter at the receiving side.

The pulse width and jitter must meet requirements defined by various standards and in the present example, the temperature compensated current is varied slowly. Also in order to make an LED of narrow bandwidth operate at high speed with respect to a targeted bandwidth, peaking was applied to the LED. Although when peaking is applied to the LED of narrow bandwidth, the emission output rises rapidly, a slight depression also occurs. Thus to suppress the depression, at least two peaking current generating circuits are provided and time-divided quantitative peaking in two steps is performed to quicken (correct) the response of the LED.

Although when a single peaking correction circuit is used, a depression occurs after peaking in the pulse waveform, the depression is significantly reduced when two or more pealing corrections are performed. A pulse waveform that is essential for the realization of stable optical communications is thereby obtained. Error-free optical communications can be performed by the above-described arrangement.

The above-described device can be used widely in undersea cable optical communication equipment, gyroscopes, information recording medium writing devices, etc.

INDUSTRIAL APPLICABILITY

This invention can be used in an LED driving circuit.

The invention claimed is:

1. An LED driving circuit comprising:
a first current source connected to an LED;
a transistor controlling a driving current flowing between the first current source and the LED;
a timing generating circuit generating a driving signal that is applied to a control terminal of the transistor; and
a temperature compensated current generating circuit providing a temperature compensated current to the first current source; and
wherein the temperature compensated current generating circuit in turn comprises:
a temperature detecting circuit;
a first comparator inputting an output of the temperature detecting circuit; and
a first current increasing circuit gradually increasing the temperature compensated current from a point in time at which output switching occurs at the first comparator.

2. The LED driving circuit according to claim 1, wherein the first current increasing circuit comprises:
a first capacitor varying a voltage from the point in time of output switching of the first comparator; and
a first current controlling transistor having a control terminal, into which the voltage of the first capacitor is input, and applying at least a portion of the temperature compensated current.

3. The LED driving circuit according to claim 2, wherein the temperature compensated current generating circuit further comprises:
a second comparator inputting the output of the temperature detecting circuit; and
a second current increasing circuit gradually increasing the temperature compensated current from a point in time at which output switching occurs at the second comparator; and
the output currents of the first and second current increasing circuits are superposed and constitute a portion of the temperature compensated current.

4. The LED driving circuit according to claim 3, wherein the second current increasing circuit comprises:
a second capacitor varying a voltage from the point in time of output switching of the second comparator; and
a second current controlling transistor having a control terminal, into which the voltage of the second capacitor is input, and applying at least a portion of the temperature compensated current.

5. The LED driving circuit according to claim 1 comprising: a second current source connected to the LED, and wherein the timing generating circuit drives the second current source in a manner such that a peaking current is supplied to the LED from the second current source.

6. The LED driving circuit according to claim 1 comprising: an LVDS receiving comparator having an output terminal connected to an input terminal of the timing generating circuit, and two input terminals, into which differential signals are input.

* * * * *